United States Patent [19]

Kurz

[11] Patent Number: 5,320,221

[45] Date of Patent: Jun. 14, 1994

[54] TRANSPORT AND PROTECTIVE CASE FOR INFORMATION MEDIUM

[75] Inventor: Josef Kurz, Owingen, Fed. Rep. of Germany

[73] Assignee: Kurz Kunststoffe GmbH, Owingen, Fed. Rep. of Germany

[21] Appl. No.: 68,403

[22] Filed: May 27, 1993

[30] Foreign Application Priority Data

Jun. 4, 1992 [DE] Fed. Rep. of Germany ....... 4218437

[51] Int. Cl.$^5$ .............................................. B65D 85/57
[52] U.S. Cl. .................................. 206/309; 206/232
[58] Field of Search .................... 206/444, 309–313, 206/232; 220/339

[56] References Cited

U.S. PATENT DOCUMENTS

| | | | |
|---|---|---|---|
| 3,561,671 | 2/1971 | Minot | 206/312 X |
| 4,363,403 | 12/1982 | Raucci, Jr. et al. | 220/339 X |
| 4,369,879 | 1/1983 | Egly et al. | |
| 4,449,628 | 5/1984 | Egly et al. | |
| 4,765,462 | 8/1988 | Rose, Jr. | |
| 4,765,469 | 8/1988 | Seifert | 206/444 |
| 4,793,480 | 12/1988 | Gelardi et al. | 220/339 X |
| 4,919,259 | 4/1990 | Beaulieu | 220/339 X |
| 5,137,150 | 8/1992 | Wolf | 220/339 X |
| 5,207,717 | 5/1993 | Manning | 206/232 |

FOREIGN PATENT DOCUMENTS 300526  9/1965  Netherlands ...................... 220/339

OTHER PUBLICATIONS

Sony Mini Disc Newsletter No. 3—Jan. 1992.

Primary Examiner—William I. Price
Attorney, Agent, or Firm—Darby & Darby

[57] ABSTRACT

The invention concerns a transport and protective case for an information medium in particularly a minidisc. According to the invention, the parts of the case are integrally attached to one another by means of film hinges. In addition, snap-lock devices that are convenient to open are provided, in order to secure the lid in its position with respect to the case bottom when the case is closed.

16 Claims, 2 Drawing Sheets

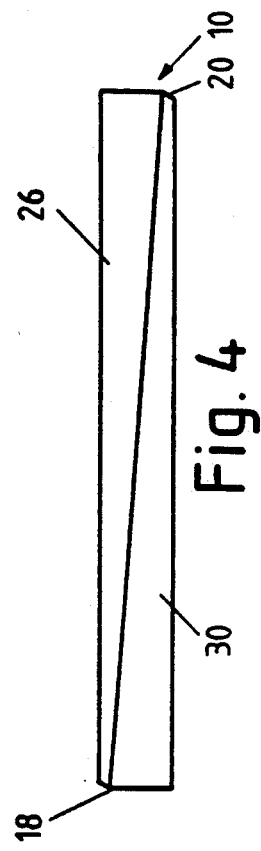
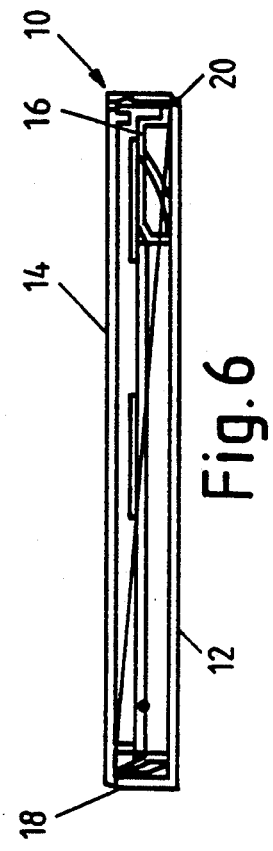
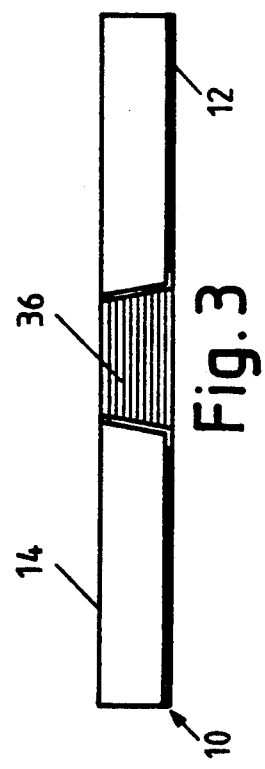
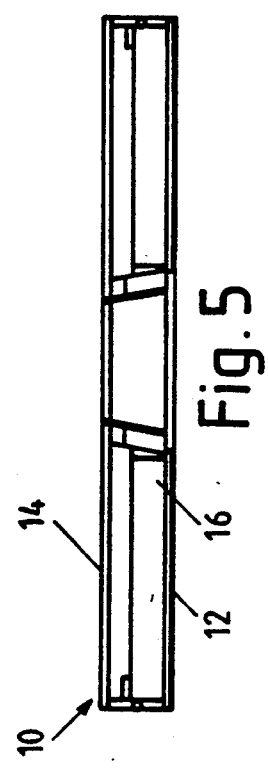
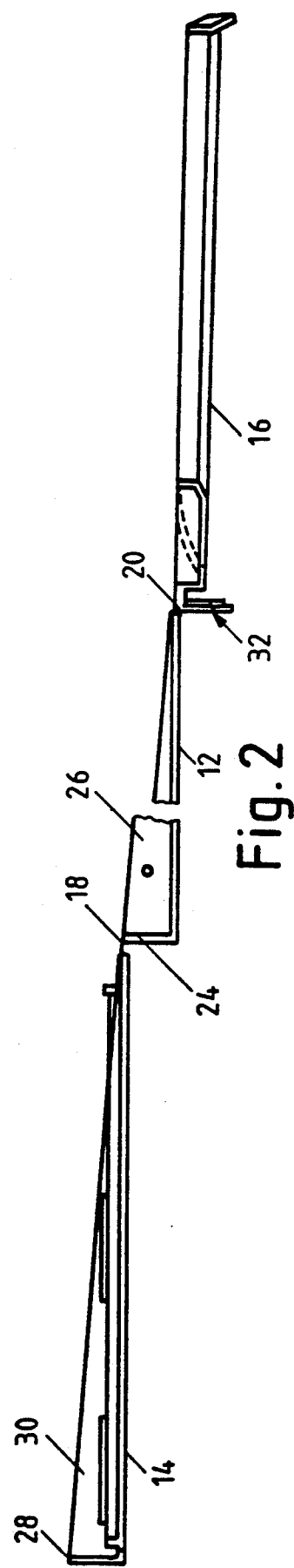

TRANSPORT AND PROTECTIVE CASE FOR INFORMATION MEDIUM

The invention concerns a transport and protective case for an information medium, in particular a minidisc, with a case bottom, with a case lid fastened pivotedly thereonto, and with an insert element for positively securing the information medium in its position inside the case.

A case of this kind for a minidisc is known from the Sony company document MiniDisc Newsletter, no. 3, January 1992.

The known case is largely designed, in terms of the configuration of case bottom and case lid, in the manner known for many years for audio cassette cases. The case bottom and case lid are separately manufactured components that are attached pivotedly to one another by means of pegs on the lid and associated holes on the bottom, the lid having, adjacent to the pivot, a rim bent into a U-shape which, when minidiscs are packaged, forms a pocket to receive a brochure or the like; while pegs are molded on or applied in some other manner on the inside of the case bottom as positioning or insert elements, and secure the four corners of a minidisc packaged in the case.

It is also known to market information media in the form of "compact discs" in flat, cassette-like cases which also have a case bottom with elevated outer rims, a separately manufactured, relatively flat case lid pivotedly attached to the case bottom, and an insert element consisting of a flat, rectangular component that is set into the case bottom and has a central gripping apparatus which can be snap-locked onto the central opening of a compact disc (CD). One advantage of such CD cases is that it is possible to insert between the case bottom and the insert element an insert sheet that is bent upward adjacent to the hinge and serves as a medium for information and advertising, supplementing a brochure or the like that is usually retained on the inside of the lid by means of suitable projections.

The known MD and CD cases are in some cases difficult to open, since the user cannot find a suitable grasping point with his or her fingers to pull apart or push together the case lid and case bottom. Moreover, the pivot attachments between case bottom and case lid have in many cases proven not to be sufficiently stable, which is attributable partly to the design (using relatively thin and weak pivot pegs), and partly to the brittleness of the materials previously used for such cases.

On the basis of the prior art, the underlying object of the invention is to improve a transport and protective case of the aforementioned kind in such a way that the danger of damage to the pivot attachment between case bottom and case lid is minimized, and, in an advantageous embodiment of the invention, opening of the case is facilitated.

The stated object is achieved in a case of this kind by the fact that the case bottom and case lid are attached integrally to one another by means of a film hinge.

One particular advantage of the transport and protective case according to the invention is the fact that the case bottom and case lid, including the film hinge which pivotedly attaches them to one another, can be economically manufactured as an integral plastic part, and that no subsequent assembly steps are needed in order to attach the bottom and lid, as was required with the cases used previously.

In a development of the invention, it has proven to be advantageous in this connection if the insert element is also attached integrally to the case bottom by means of a film hinge, since in this instance "assembly" of the case is limited to folding the insert element into the bottom, and then closing the lid over these two parts. Previously, however, the insert element was manufactured as a separate component, normally from a different plastic material, and had to be fitted into the case bottom before or after the pivot attachment to the case lid was made.

In a further embodiment of the invention, it is particularly favorable if all the parts of the case are made entirely of the same material, so they can be manufactured in a single working step from the same material, in particular by injection molding; this has the additional advantage that a case of this kind made from only a single material is particularly suitable for later recovery as part of a recycling process.

In addition to further advantageous embodiments of the invention, which are the subject of further dependent Claims, one particularly advantageous embodiment of the case according to the invention consists in the fact that the case bottom and case lid can be attached to one another, when closing the case, on the side thereof opposite the film hinge, by means of snap-lock devices that comprise an elastic pusher element fitted with a snap lug on one part of the case, and a groove complementary to the snap lug on a rim region of the case lid on the open side of the case.

A pusher element of this kind offers effective simplification and assistance when opening the case, particularly when it is physically separated, for example by indentations, from the adjacent parts, and differentiated by means of fluting or some other kind of roughened surface from the other parts of the case; in a related additional advantageous embodiment of the invention, the film hinge attaching the case bottom and the case lid can be configured so that it generates a preloading that acts in the opening direction, so that immediately after the latch is undone the case opens to some extent by itself; in this connection it is entirely possible to design the hinge to produce a kind of "beyond-dead-center" function, which causes the lid to snap into its fully open position after an opening process begins.

Further details and advantages of the invention are explained in greater detail below with reference to the drawings, in which:

FIG. 2 shows a schematic cross section through the case according to FIG. 1 with the insert element folded out of the case bottom;

FIG. 3 shows a side view of the narrow side, opposite the hinge attaching bottom and lid, of a closed case according to the invention;

FIG. 4 shows a side view of the case, rotated 90° to the left from the side view according to FIG. 3;

FIG. 5 shows a schematic cross section through the closed case according to FIG. 3, with an inside view of the snap-lock devices;

FIG. 6 shows a schematic cross section through the closed case according to FIG. 4;

Figure 1:
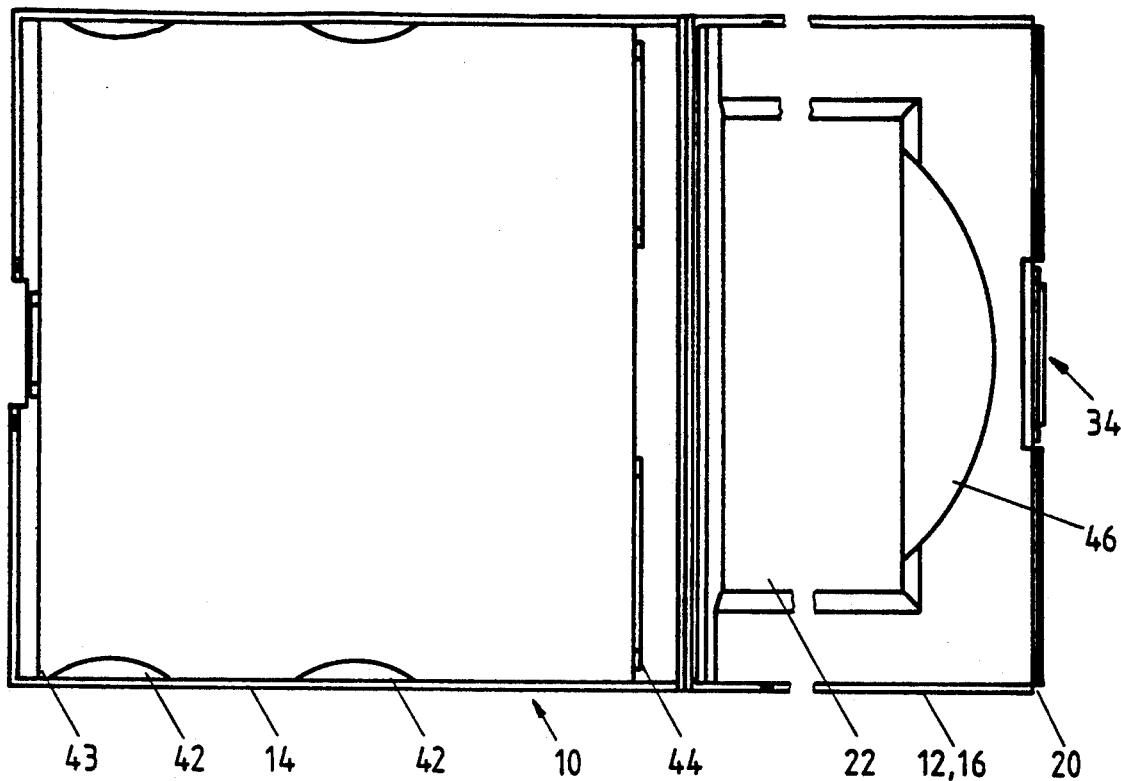
FIG. 1 shows a top view of the inside of an open case according to a preferred embodiment of the invention.
Figure 7:
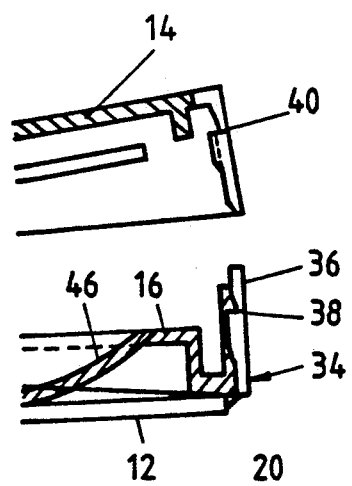
FIG. 7 shows an enlarged cross section through the interacting parts of the snap-lock devices provided on the case.

Considering first of all the cross section according to FIG. 2 of the drawings, it is evident that a case 10 according to the invention has three main elements, namely a case bottom 12, a case lid 14, and an insert element 16. The bottom 12 and lid 14 are pivotedly attached to one another by means of a first film hinge 18. Furthermore the case bottom 12 and insert element 16 are also pivotedly attached to one another on the opposite side by means of a second film hinge 20. By pivoting the insert element 16 around the second film hinge 20 counterclockwise in FIG. 2, the insert element 16 can be inserted fully into the bottom of the case 12, so that what is first obtained is the open case shown in FIG. 1. An information medium (not shown), in particular a minidisc (MD), can now be inserted so as to fit into a recess 22 provided in the frame-shaped insert element If the lid 14 is then pivoted clockwise around the first film hinge 18, the result is a closed case as shown in FIGS. 3 and 4 in various side views, and in FIGS. 5 and 6 in schematic cross-sectional depictions.

As is evident from the totality of FIGS. 1 to 8, the case bottom 12 and case lid 14 have rim regions bent at right angles to their base surfaces and projecting upward or respectively toward the other component; one rim region 24 that is provided on the case bottom 12 adjacent to the first film hinge 18 forms a continuous smooth back surface for the case 10 when the latter is closed.

The rim region 24 has a width and height that are substantially equal to the thickness and height of the closed case since when the case 10 is closed, only the material thickness of the main surface of the altogether relatively thin case lid 14 is located above the upper edge of the rim region 24.

From the back wall or rear rim region 24, side walls or lateral rim regions 26 of decreasing height run obliquely toward the rim of the bottom 12 adjacent to the second film hinge 20, where the height of the lateral rim regions 26 reaches a value of zero.

Extending along the rim of the case lid 14 facing away from the first film hinge 18 is a rim region 28 which, when the case 10 is closed, forms part of the front wall thereof, as is evident especially from FIGS. 3 and 5. The side walls or lateral rim regions 30 of the case lid 14 run, like the lateral rim regions 26 of the bottom 12, obliquely with decreasing height toward the edge of the lid 14 adjacent to the first film hinge 18. This embodiment of the lateral rim regions 26, 30 of the bottom 12 and lid 14, respectively, results, when the case is closed (as is evident especially from FIG. 4), in a side surface or narrow side of the case 10 that is split essentially diagonally.

The insert element 16 is provided, adjacent to the second film hinge 20, with a rim region 32 which is bent vertically like the other rim regions and which, when the case parts are completely folded out as in FIG. 2, projects downward with respect to the underside of the case bottom 12, but then, when the insert element is pivoted inward, projects vertically upward parallel to the rear rim region 24 above the rim of the case bottom 12 adjacent to the second film hinge 20, and forms a portion of the front wall of the closed case, as is evident especially from FIGS. 3 and 5 but is also visible in the top view according to FIG. 1.

When the case 10 is closed, or when the insert element 16 is folded inward and the case lid 14 is closed, the various rim regions 24, 26, 28, 30, 32 discussed above together form a rim that encloses the case 10 in a sealed manner, so that an information medium inside the closed case 10 can be housed in a protected manner.

One particular feature of the case according to the invention, as compared with cases used previously for audio cassettes, CDs, and MDs, consists in the fact that special snap-lock devices are provided on the side of the case facing away from the first film hinge 18, by means of which the case lid 14 can be fastened in a releasable manner with respect to the case bottom 12.

Figure 8:
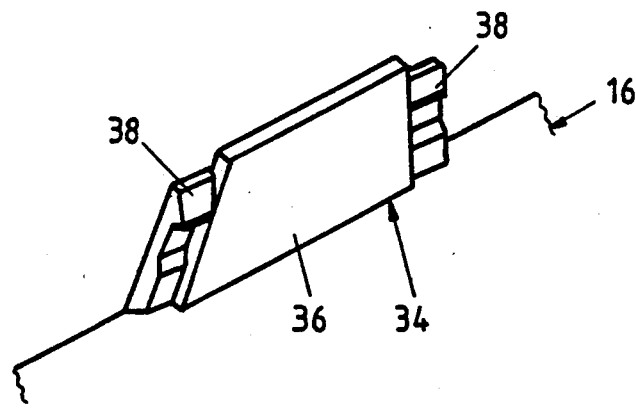
FIG. 8 shows a schematic perspective depiction of a pusher element of the snap-lock devices.

Specifically, the rim region 32 adjacent to the second film hinge 20, which is molded onto the insert element 16, comprises a pusher element 34 that, in accordance with FIG. 8 of the drawings, has a pusher plate 36 onto both sides of which, according to a preferred exemplary embodiment, snap lugs are molded, and the outer side of which, as is evident from FIG. 3, is provided with fluting or some other rough surface finish that prevents or hinders slippage.

The snap lugs 38 can be snap-locked into a snap groove 40 (see FIG. 7) on the inside of the front rim region 28 of the case lid 14. When the snap-lock attachment between case bottom 12 and case lid has been made by snapping the snap lugs 38 into the snap groove 40, the case 10 according to the invention remains securely closed. On the other hand, the pusher element 34 constitutes a component that can deflect inward—i.e. toward the interior of the closed case—relatively easily under manually generated pressure utilizing the elasticity of the case material, so that the case can easily be unlatched and opened by pressing on the pusher element 34.

With regard to easy opening of the case 10, it has been found to be advantageous if the first film hinge 18 is configured, in terms of its dimensions and thickness, so that when the case 10 is closed the lid 14 is under a definite preloading that acts so as to open the case, so that when the snap-lock attachment between the parts 38 and 40 of the snap-lock devices is released, the lid 14 automatically springs into an open position. The extent to which the case opens in response to the spring force of the first film hinge can be influenced by configuring the film hinge as desired.

In contrast to the first film hinge 18, the second film hinge 20 is preferably configured so that the insert element 16, after it has been pivoted to fold into the case bottom 12, maintains this interior position; it is possible, by suitably selecting the dimensions of the outer rims or surfaces of the insert element 16 on the one hand and the inner wall surfaces of the case bottom 12 on the other hand, to achieve a certain gripping effect, and/or to secure the insert element 16 in its position inside the case bottom 12 by means of suitable snap-lock devices.

Although the case discussed above is clearly different from previous cassette-like cases used, for example, for CDs, it is possible with this case as well to arrange inside it, for purposes of information and/or advertising, an insert sheet known in the trade as a "cover." With the case parts folded out completely according to FIG. 2, this insert sheet (not shown) is laid on the inside of the bottom surface of the case bottom 12, and a folded-over strip portion is laid against the case spine or rim region 24.

If necessary, the parts of the insert sheet adjacent to the lateral rim regions 26 can also be folded upward in order to perform a decorative and/or informative function along the lengthwise narrow sides of the case as well, when the latter is closed.

As is evident especially from FIG. 1, securing projections 42 are furthermore provided on the inside of the case lid 14, defining an insertion slot, delimited at the inner end by stops 44, into which an information brochure (43) comprising one or more pages can be inserted in the same way as with CD cases.

Another important feature of the case according to the invention consists in the fact that the frame-shaped insert element 16, as is evident especially from the top view according to FIG. 1, has on three sides of the recess 22 a relatively wide rim, resulting in case dimensions that are considerably greater than the case size required for a minidisc; this has several advantages. First, a larger case allows the insertion of a larger brochure or the like, and therefore improved advertising effect, while at the same time making a larger surface available for information. Furthermore, a larger case or cassette is not as easy to misplace or, at least temporarily, to lose. In addition, the greater dimensions offer a certain (albeit limited) protection against attempted theft. A further advantage of the wider rim also consists in the fact that a grasping trough 46 can be created adjacent to the pusher element 34, allowing for easy and comfortable handling of an information medium inserted in the recess 22.

Cases according to the invention are preferably made of polypropylene. It is also possible, however, to use other plastics, for example polyoxymethylene, that are suitable for the production of film hinges and are sufficiently transparent.

I claim:

1. A transport and protective case for an informing medium comprising:
    a case bottom having a first side and an opposite second side;
    a case lid being pivotally attached to the case bottom by means of a first living hinge disposed at said first side;
    an insert element being integrally connected to the case bottom by means of a second living hinge disposed at said second side, the insert element being pivotally insertable into the case bottom; and
    means for positively securing the information medium in a position inside the case.

2. The case according to claim 1, wherein said case lid, said case bottom and said insert element are made of the same material.

3. The case according to claim 1, wherein the case bottom and the case lid are provided with complementary raised rim regions that enclose the case in a sealed manner when the lid is closed.

4. The case according to claim 3, wherein the rim regions of the case bottom and of the case lid are configured as triangles at narrow sides running perpendicular to at least one of the living hinges, such that the rim regions combine at the narrow sides, when the case is closed, to form a diagonally split narrow side surface.

5. The case according to claim 1, wherein snap-lock devices create an elastic snap-lock attachment between the case bottom and the case lid and are provided on the open side of the case opposite the first living hinge between case lid and case bottom.

6. The case according to claim 5, wherein the snap-lock devices comprises an elastic pusher element fitted with a snap lug, and a snap groove complementary to the snap lug on a rim region of the case lid on the open side of the case.

7. The case according to claim 6, wherein the pusher element is provided on the insert element adjacent to the second living hinge which attaches the insert element to the case bottom.

8. The case according to claim 7, wherein the pusher element is a component of a rim region protruding from the insert element, and is separated from other parts of said rim region by indentations.

9. The case according to claim 1, further including an insert sheet that is bent at least in the region of the first living hinge attaching the case lid and the case bottom, and is arranged between the inside of the case bottom and the side of the insert element adjacent thereto.

10. The case according to claim 1, wherein securing projections, which define an insertion slot, are molded onto the inside of the case lid.

11. The case according to claim 1, wherein the case lid has a transparent window region through which an information medium inserted into the case is at least partly visible.

12. The case according to claim 1, wherein the case lid and the case bottom are made of transparent plastic material.

13. The case according to claim 6, wherein the outside of the pusher element is fluted.

14. The case according to claim 2, wherein the insert element has a peripheral rim that surrounds a recess to receive the information medium.

15. The case according to claim 14, wherein the rim region of the insert element is broadened on at least one side to result in a size for the entire case that considerably exceeds the outside dimensions of the information medium.

16. The case according to claim 1, wherein the first living hinge is configured and dimensioned so that there is a defined preloading in the opening direction for the case lid with respect to the case bottom.

* * * * *